United States Patent [19]
Yanagi et al.

[11] Patent Number: 5,493,863
[45] Date of Patent: Feb. 27, 1996

[54] RESERVOIR FOR MASTER CYLINDER

[75] Inventors: Kunio Yanagi; Syussaku Chiba, both of Higashimatsuyama, Japan

[73] Assignee: Jidosha Kiki Co., Ltd., Tokyo, Japan

[21] Appl. No.: 343,177

[22] Filed: Nov. 22, 1994

[30] Foreign Application Priority Data

Nov. 25, 1993 [JP] Japan .................................. 5-294832

[51] Int. Cl.⁶ ........................... F15B 7/00; B01D 27/00
[52] U.S. Cl. .................... 60/583; 60/585; 210/444; 210/451
[58] Field of Search ................... 60/533, 583, 585, 60/586, 587, 588, 592; 210/168, 171, 444, 451, 455, DIG. 17

[56] References Cited

U.S. PATENT DOCUMENTS

| | | | |
|---|---|---|---|
| 3,502,221 | 3/1970 | Butterfield | 210/444 |
| 4,036,758 | 7/1977 | Combest | 210/451 X |
| 4,204,966 | 5/1980 | Morgan | 210/455 |
| 4,721,563 | 1/1988 | Rosaen | 210/451 X |
| 4,805,668 | 2/1989 | Genter et al. | 60/592 X |

*Primary Examiner*—Edward K. Look
*Assistant Examiner*—Hoang Nguyen
*Attorney, Agent, or Firm*—Arnold, White & Durkee

[57] ABSTRACT

An arc-shaped flange 32 is provided protrusively on the peripheral surface at the top end of a filter 30, and guide ribs 33 extending downward are formed on the lower surface at both sides of the flange 32, so that the ribs 33 are slid in a cutout 12 formed in an annular rib 11 to guide the filter 30, and the cutout 12 is covered by the flange 32 when the filter 30 is put into a tank body 10.

2 Claims, 7 Drawing Sheets

RESERVOIR FOR MASTER CYLINDER

FIELD OF THE INVENTION AND RELATED ART STATEMENT

The present invention relates to a reservoir for master cylinder.

The reservoir for master cylinder filters oil by using a cup-shaped filter to prevent dust etc. of the outside from entering the reservoir together with hydraulic fluid when the hydraulic fluid is poured into the reservoir chamber.

In the reservoir shown in FIGS. 10 to 13, an annular rib 2 is protrusively provided on the inner peripheral surface of a tank body 1, and the tank body 1 holds a cup-shaped filter 3 as shown in FIG. 11 by fitting the upper edge 3a of the filter 3 to the annular rib 2.

Also, in this reservoir, an arch-shaped rib 4 is protrusively provided above the annular rib 2, and a claw 6 is formed under a cap 5. The lower part of the cap 5 is inserted into the inside of the tank body 1 through an opening thereof, and the cap 5 is turned through an appropriate angle to allow the claw 6 to engage with the arc-shaped rib 4, by which the cap 5 is fixed to the tank body 1.

For the above-described reservoir, the tank body 1 is molded by using dies. By cutting out a part of the annular rib 2 located under the arc-shaped rib 4 as shown in FIG. 12, the tank body 1 can be molded by upper and lower dies only.

Therefore, when the filter 3 is mounted to the tank body 1, an open portion A is formed at a cutout 8 between the filter 3 and the tank body 1, so that there is a possibility that unfiltered fluid, dust, etc. enter the reservoir through the open portion A, for example, when fluid is replenished.

OBJECT AND SUMMARY OF THE INVENTION

Accordingly, an object of the present invention is to provide a reservoir for master cylinder which prevents, as much as possible, unfiltered fluid, dust, etc. from entering a reservoir chamber when fluid is replenished.

A reservoir for master cylinder of the present invention includes a tank body and a cap, the tank body having an annular rib provided protrusively on the inner peripheral surface thereof, part of the annular rib being cut out, and an arc-shaped rib being provided protrusively above the cutout, so that the upper edge of a cup-shaped filter fits the annular rib to hold the filter in the tank body, and the cap having a claw at the lower part thereof, the cap covering an opening Of the tank body, the lower part of the cap being put into the inside of the tank body through the opening, and the cap being turned through an appropriate angle, thereby engaging the claw with the arc-shaped rib to fix the cap to the tank body, wherein an arc-shaped flange is provided protrusively on the peripheral surface at the top end of the filter, and guide ribs extending downward are formed on the lower surface at both sides Of the flange, so that the ribs are slid in the cutout to guide the filter, and at least great portion of the cutout is covered by the flange when the filter is put into the tank body.

For the reservoir for master cylinder in accordance with the present invention, the filter is guided downward by the guide ribs on the filter and the cutouts on the tank body, and mounted at a predetermined position. Since the filter flange closes the cutout when the filter is mounted, unfiltered fluid, dust, etc. are prevented as much as possible from entering a reservoir chamber via the cutouts.

DETAILED DESCRIPTION OF PREFERRED EMBODIMENTS

Figure 1:
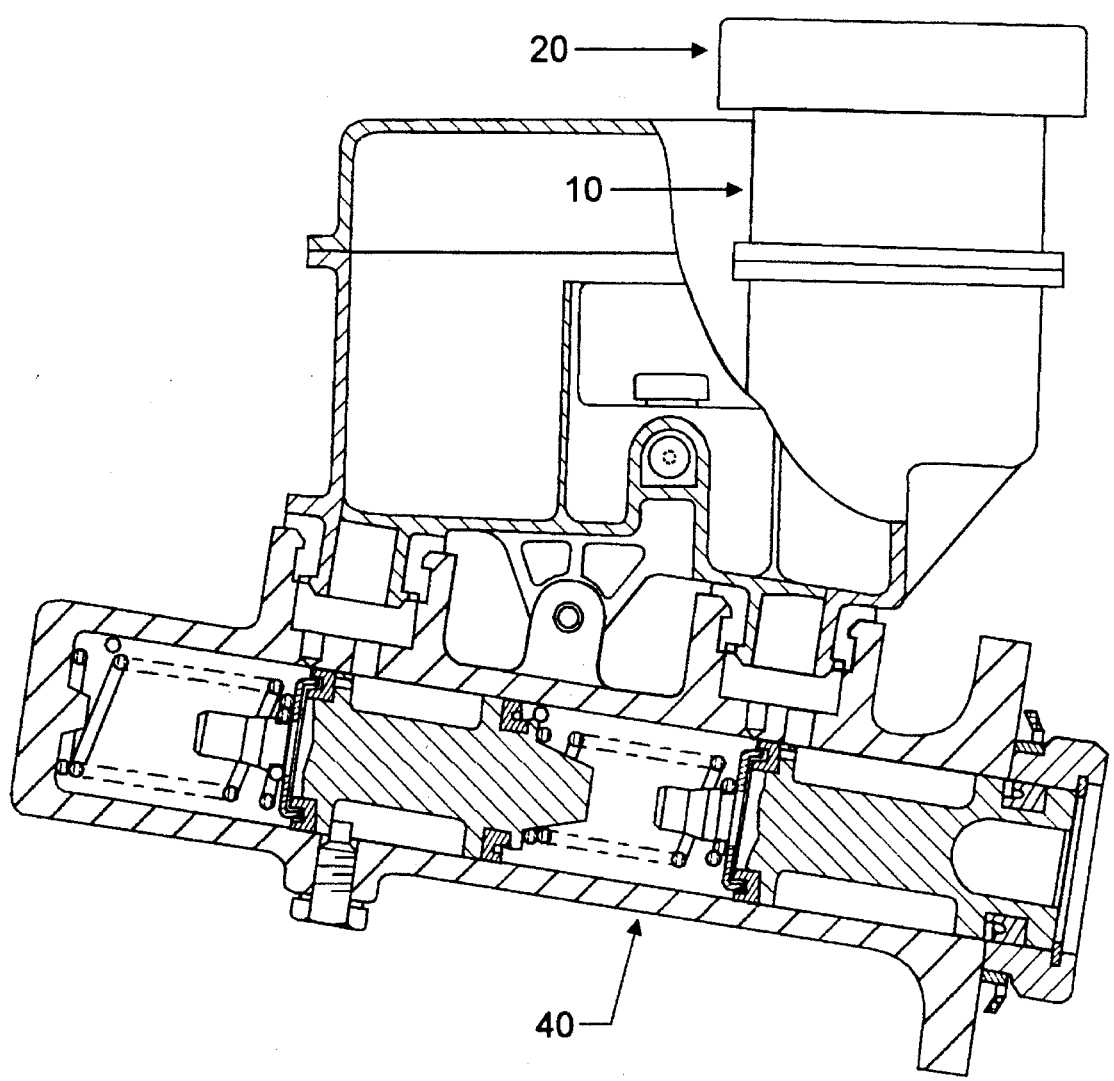
FIG. 1 is a partially sectional view showing one example of a master cylinder to which a reservoir of the present invention is applied.

FIG. 1 is a partially sectional view showing one example of a master cylinder to which a reservoir of the present invention is applied. In the figure, reference numeral 10 denotes a tank body, 20 denotes a cap, and 40 denotes a master cylinder.

FIGS. 2 to 6 show a first embodiment of a reservoir for master cylinder in accordance with the present invention.

Figure 2:
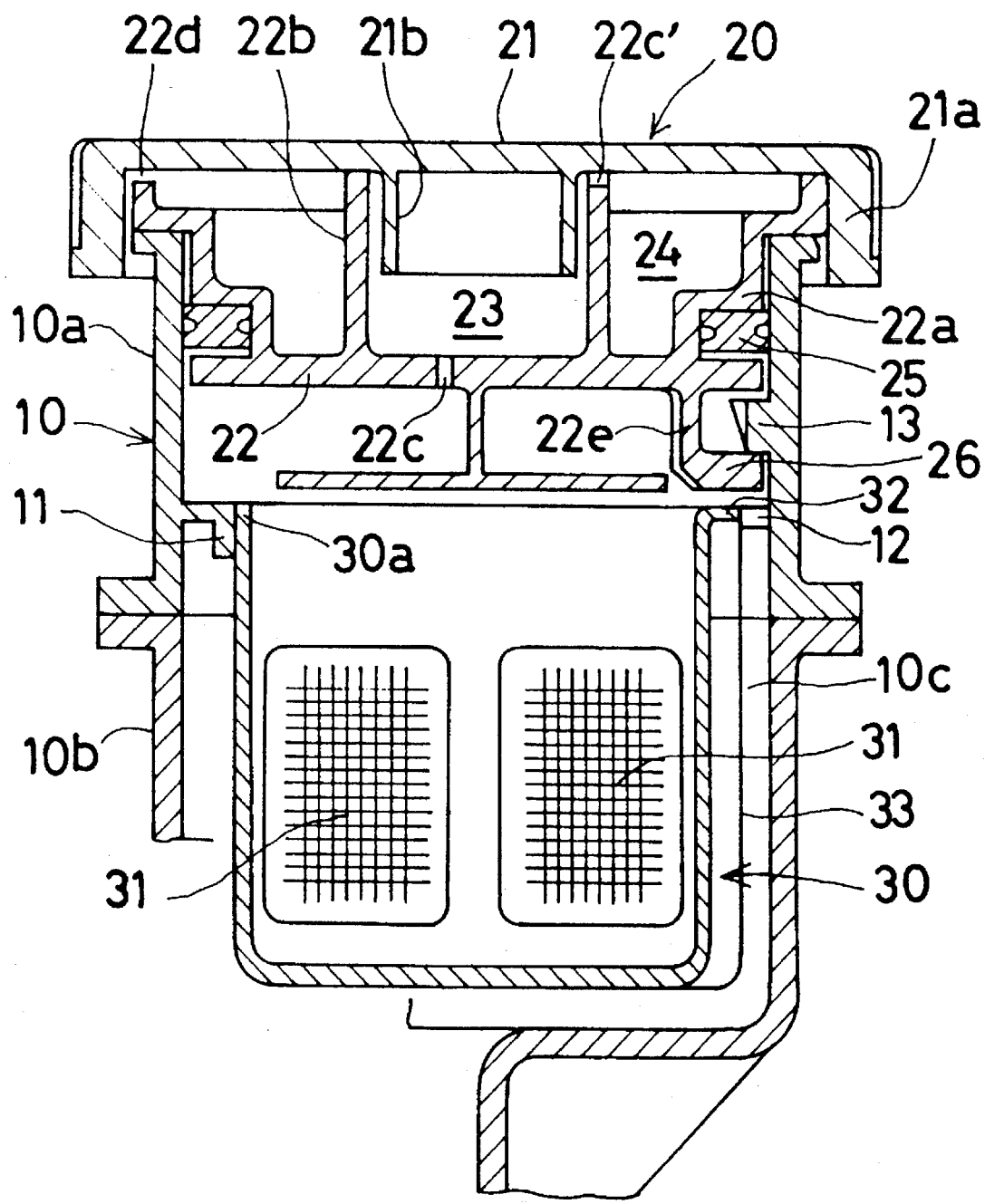
FIG. 2 is a sectional view of a first embodiment of a reservoir for master cylinder in accordance with the present invention.
Figure 3:
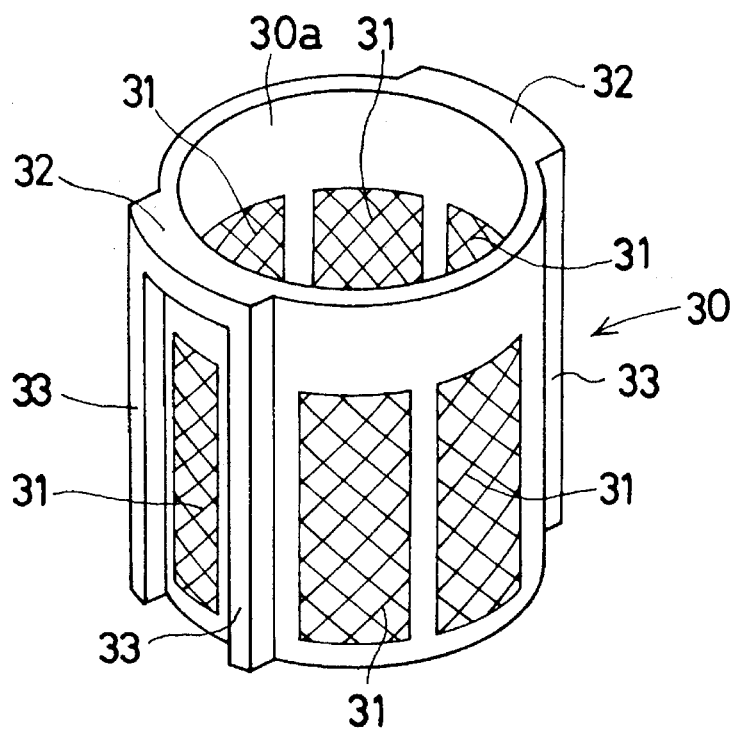
FIG. 3 is a perspective view of a filter of the first embodiment.

The oil reservoir for master cylinder shown in FIG. 2 includes a tank body 10 for containing hydraulic fluid therein and a cap for closing an opening of the tank body 10.

The tank body 10 consists of a housing upper part 10a forming the opening of the tank body 10 and a housing lower part 10b forming a space for containing hydraulic fluid. The housing upper part 10a is formed into a tubular shape, and provided with an annular rib 11 protruding toward the inside on the lower inner peripheral surface of the wall thereof. The annular rib 11 has cutouts 12 at the opposite two places, and an arc-shaped rib 13 is formed above the cutout 12. The arc-shaped rib 13 serves to receive a claw of the cap, described later, and has a slant guide surface 13a at one end thereof. At the end of the cutout 12, a vertical rib 14 extending vertically is formed to connect the annular rib 11 to the arc-shaped rib 13.

This reservoir is provided with a filter 30 as shown in FIG. 2. The filter 30, being of a tubular shape with a bottom, has net portions 31 on the peripheral wall and the bottom wall thereof. Further, the filter 30 has arc-shaped flanges 32 extending outward at the periphery of the top end. The flanges 32 are formed at the opposite portion of the periphery. The length of the flange 32 in the circumferential direction is almost equal to the length of the aforementioned cutout 12. At both ends of the flange, guide ribs 33 extending downward are provided.

The cap 20 consists of an upper member 21 and a lower member 22. The upper member 21 has a tubular frame portion 21a at the periphery, and an annular rib 21b disposed downward on the ceiling surface at the inside center. The lower member 22 has a tubular frame portion 22a at the periphery, and an annular rib 22b disposed upward in the interior. The upper member 21 and the lower member 22 are assembled with each other, and the end of the frame portion 22a is welded to the ceiling surface of the upper member 21. Thus, an inner chamber 23 and an outer chamber 24 are defined by the annular rib 22b between the assembled upper and lower members 21 and 22. The inner chamber 23 communicates with a reservoir chamber 10c in the tank body 10 via a hole 22c formed in the bottom wall of the inner chamber 23, and also communicates with the outer chamber 24 via a cutout 22c' formed at the top end of the annular rib 22b. The outer chamber 24 communicates with the outside of the reservoir via a cutout 22d formed at the top end of the frame portion 22a.

On the peripheral surface at the intermediate portion of the lower member 22 of the cap 20 is mounted a gasket 25, which abuts against the inner peripheral surface of the tank body 10 to provide sealing between the tank body 10 and the cap 20.

The cap 20 also has tongues 22e at the opposite positions under the peripheral edge of the lower member 22. A claw 26 is formed at the tip end of the tongue 22e.

The filter 30 is allowed to drop into the reservoir chamber 10c while sliding the guide rib 33 of the filter 30 along the vertical rib 14 and the side face of the cutout 12. The filter 30 reaches a predetermined position in the reservoir chamber 10c; the upper edge 30a of the filter 30 is held by the annular rib 11, and the flanges 32 fits the cutouts 12, so that the cutouts 12 are closed.

Figure 4:
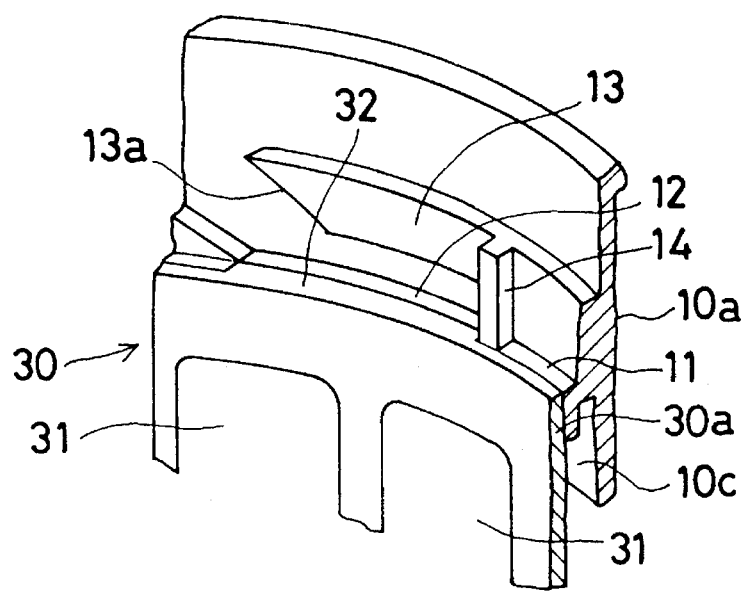
FIG. 4 is a perspective view of a principal portion of the reservoir of the first embodiment.
Figure 5:
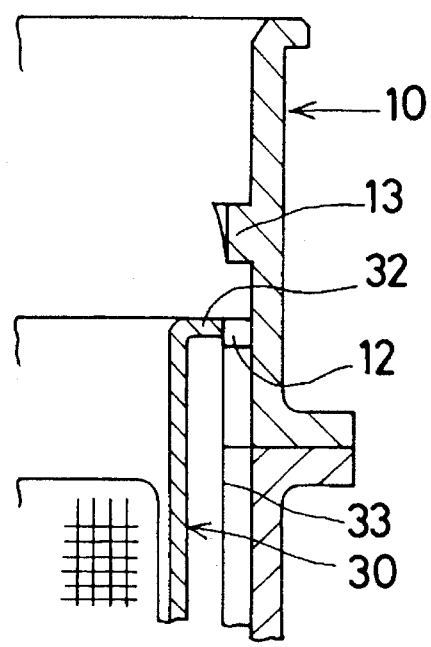
FIG. 5 is a sectional view of the principal portion shown in FIG. 4.
Figure 6:
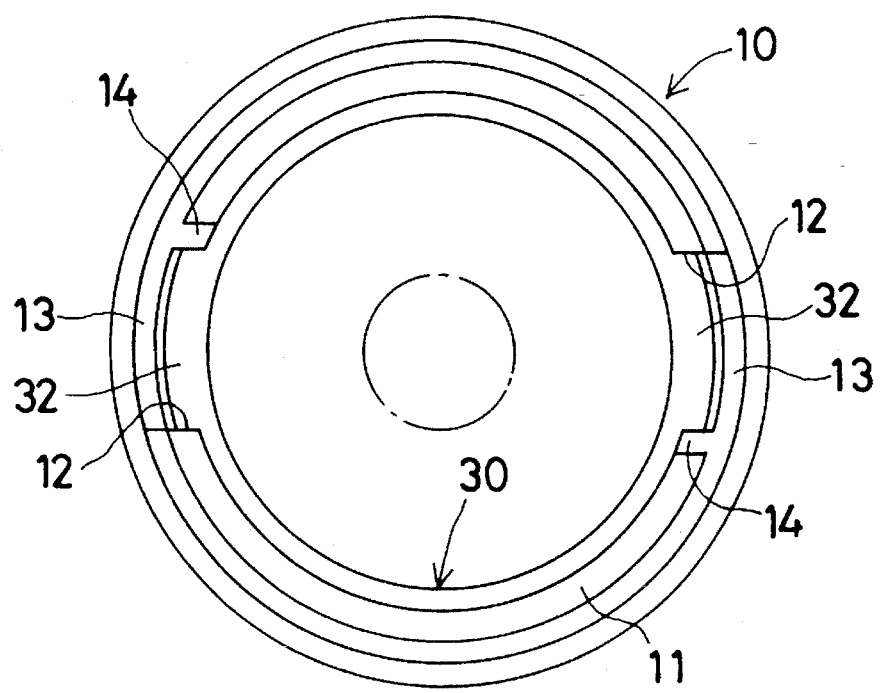
FIG. 6 is a plan view of the reservoir of the first embodiment with its cap being removed.

This condition is shown in FIG. 4. In this embodiment, the portion of the cutout 12 which is visible from the above of the outside is closed by the flange 32 of the filter 30 as shown in FIGS. 5 and 6. Therefore, hydraulic fluid won't flow directly into the reservoir chamber 10c when fluid is replenished.

When the cap 20 is fixed to the tank body 10, the lower member 22 is inserted into the tank body 10, and then the cap 20 is turned. At this time, the claw 26 of the cap 10 abuts against the slant surface 13a of the annular rib 13, and advances along the slant surface 13a. Accordingly, the cap 10 is drawn into the reservoir chamber 10c. The claw 26 abuts against the vertical rib 14, by which the cap 10 is positioned there. This is the fixed condition of the cap 10.

Figure 7:
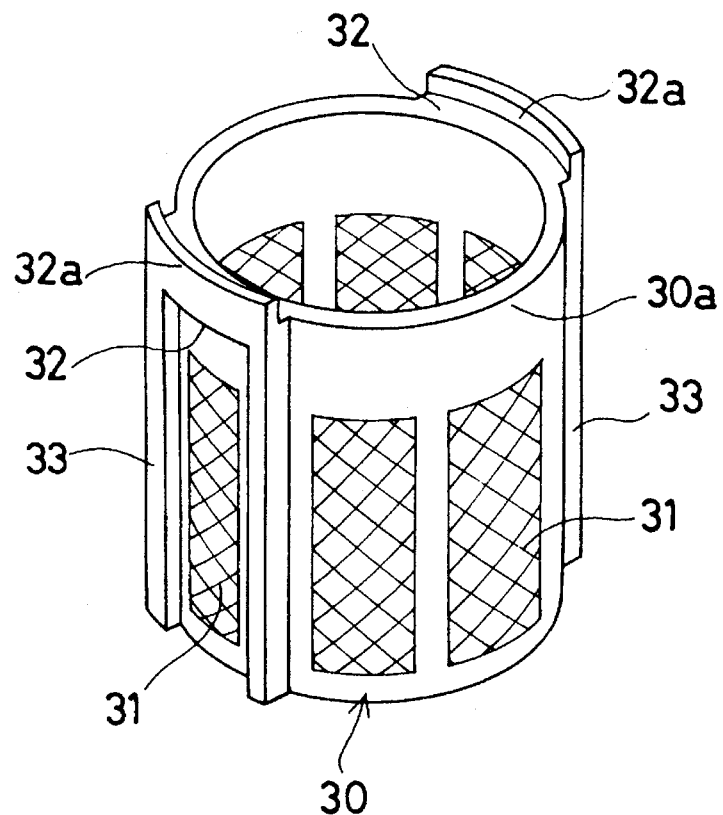
FIG. 7 is a perspective view of a filter of the second embodiment for the reservoir for master cylinder in accordance with the present invention.
Figure 8:
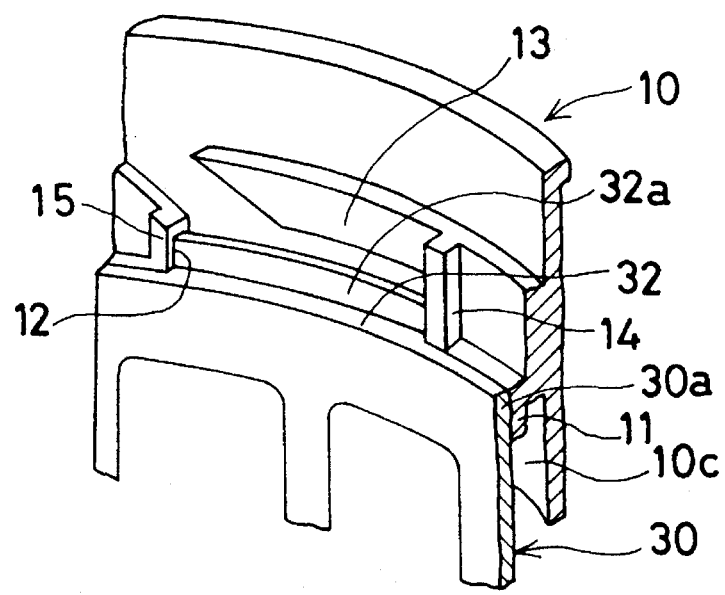
FIG. 8 is a perspective view of a principal portion of a tank body of the second embodiment.
Figure 9:
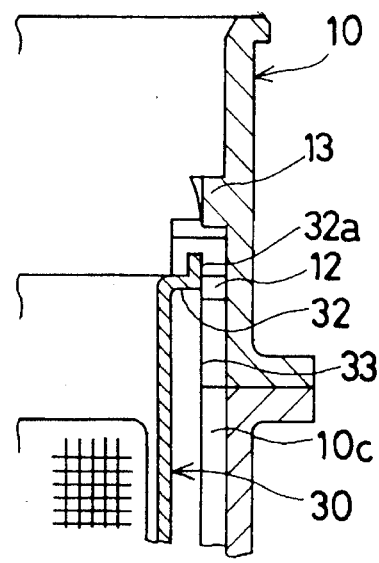
FIG. 9 is a sectional view of the principal portion shown in FIG. 8.
Figure 10:
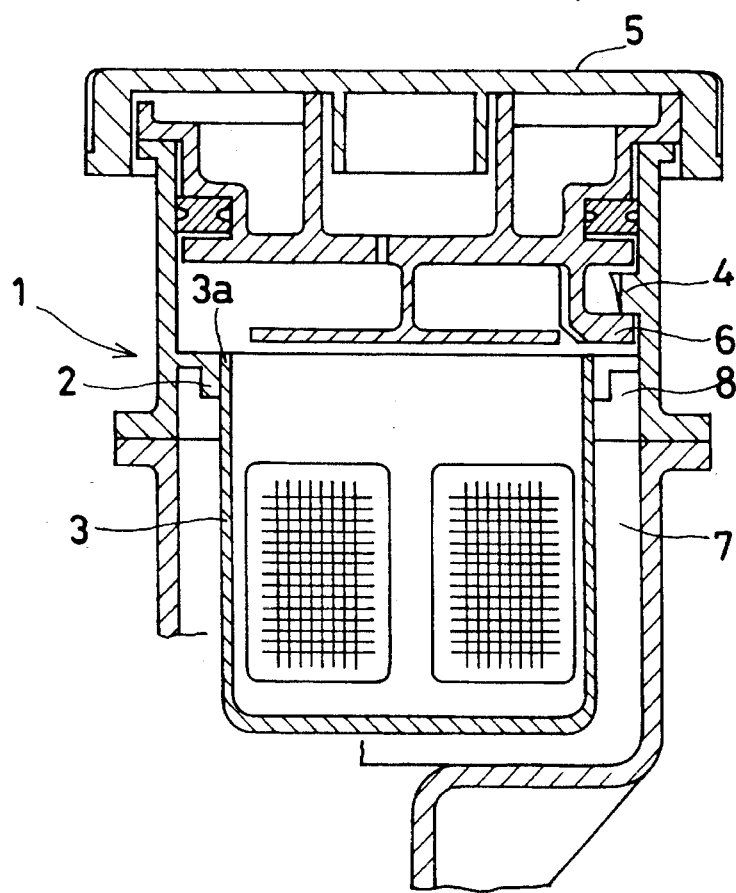
FIG. 10 is a vertical sectional view of a conventional reservoir for master cylinder.
Figure 11:
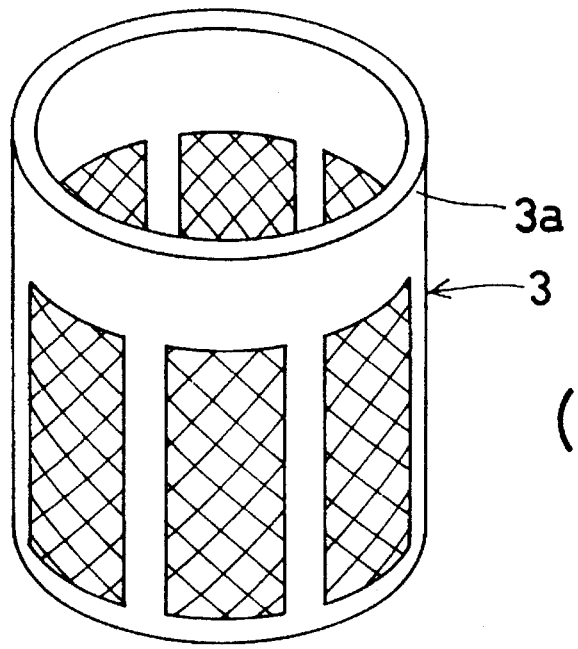
FIG. 11 is a perspective view of a filter used in the conventional reservoir for master cylinder.
Figure 13:
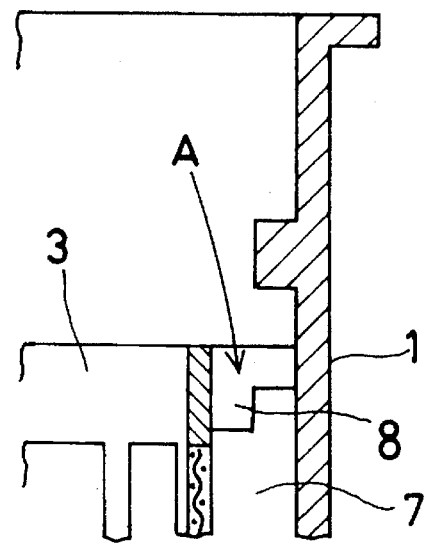
FIG. 13 is a sectional view for illustrating a problem with the conventional reservoir for master cylinder.
Figure 12:
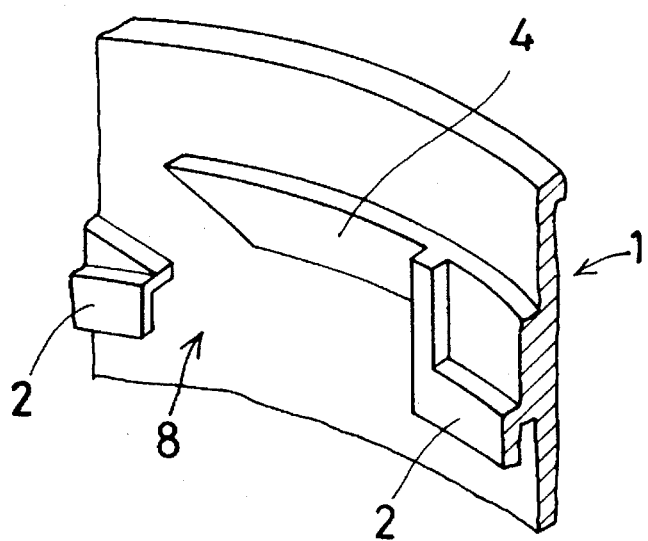
FIG. 12 is a perspective view of a part of a tank body of the conventional reservoir for master cylinder.

FIGS. 7 to 9 show a second embodiment of the reservoir of the present invention. For the reservoir of the first embodiment described above, there is a possibility that part of hydraulic fluid which hits the flange 32 of the filter 30 flows into the reservoir chamber 10c via the portion where the cutout 12 is not closed. In this embodiment, the hydraulic fluid is completely prevented from entering the reservoir chamber 10c.

The filter 30 of the reservoir of this embodiment has walls 32a extending upward throughout the total length of the edge portions of the flanges 32. At both ends of the flange 32, guide ribs 33 extending downward are formed. On the other hand, the tank body 10 has a vertical rib 15 with a small height is formed so as to be in opposition to the vertical rib 14 with the cutout 12 between two vertical ribs.

The filter 30 is placed into the reservoir chamber 10c while sliding the guide ribs 33 of the filter 30 along the vertical ribs 14 and 15 and the side surface of the cutout 12. The filter 30 reaches a predetermined position in the reservoir chamber 10c, where the upper edge 30a of the filter 30 is held by the annular rib 11, and the flange 32 fits the cutout 12, so that the cutout 12 is closed. For this reservoir, when the filter 30 is mounted at a predetermined position of the tank body 10, the wall 32a of the filter 30 is positioned between the vertical ribs 14 and 15 of the tank body 10.

In this embodiment, the wall 32a prevents hydraulic fluid dropping onto the flange 32 from flowing to the cutout 12, so that all amount of hydraulic fluid flows into the filter 30.

In the second embodiment, the portions other than described above are the same as those in the first embodiment; therefore, the explanation is omitted.

As described above, according to the reservoir for master cylinder in accordance with the present invention, by fitting the guide ribs of the filter to the cutouts of the tank body, the filter can be mounted at a predetermined position merely by pushing the filter toward the lower part of the tank body. Therefore, the filter mounting operation is very easy.

Also, since the cutouts of the tank body are closed by the flanges of the filter, hydraulic fluid won't flow directly into the reservoir chamber via the cutouts. Therefore, there is no possibility that unfiltered fluid, dust, etc. enter the reservoir chamber.

We claim:

1. A reservoir for a master cylinder comprising a tank body, a cup-shaped filter, and a cap, said tank body having an opening and an annular rib provided protrusively on the inner peripheral surface thereof, part of said annular rib having an arc-shaped cutout, and an arc-shaped rib being provided protrusively above said cutout, so that the upper edge of said cup-shaped filter fits said annular rib to hold said filter in said tank body, and said cap having a claw at the lower part thereof, said cap covering said opening of said tank body, the lower part of said cap being put into the inside of said tank body through said opening, and said cap being turned to an appropriate angle, thereby engaging said claw with said arc-shaped rib to fix said cap to said body, said filter further including a guide rib adapted to guide said filter into said tank body by engaging said cutout, and an arc-shaped flange protruding from said filter and arranged to substantially cover said arc-shaped cutout when said filter is in position in said tank body.

2. A reservoir for a master cylinder according to claim 1, including a wall formed at the periphery of said flange and extending upwardly from said filter.

* * * * *

UNITED STATES PATENT AND TRADEMARK OFFICE
CERTIFICATE OF CORRECTION

PATENT NO. : 5,493,863
DATED : February 27, 1996
INVENTOR(S) : Kunio Yanagi, et al.

It is certified that error appears in the above-indentified patent and that said Letters Patent is hereby corrected as shown below:

On the title page, item [75]:

"Inventors: Kunio Yanagi; Syussaku Chiba, both of Higashimatsuyama, Japan" should be changed to correct the misspelling of an inventor's name as follows:

-- Inventors: Kunio Yanagi; Syusaku Chiba, both of Higashimatsuyama, Japan --

Signed and Sealed this

Eighteenth Day of June, 1996

*Attest:*

BRUCE LEHMAN

*Attesting Officer*  *Commissioner of Patents and Trademarks*